July 10, 1923.
A. H. MITTAG
1,461,553
ELECTRIC SHIP PROPULSION
Filed Sept. 24, 1921
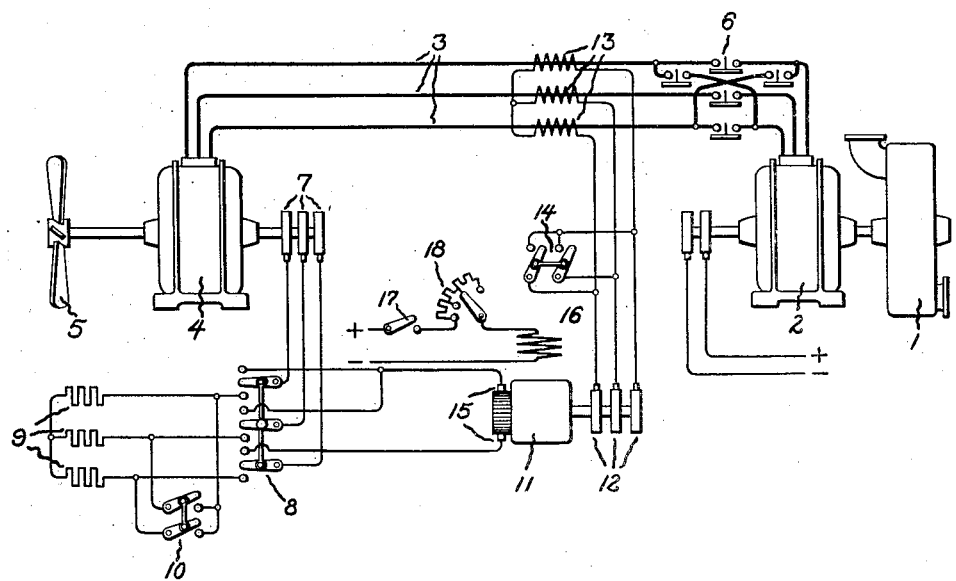
Inventor:
Albert H. Mittag,
by Albert G. Davis
His Attorney.

Patented July 10, 1923.

1,461,553

UNITED STATES PATENT OFFICE.

ALBERT H. MITTAG, OF SCHENECTADY, NEW YORK, ASSIGNOR TO GENERAL ELECTRIC COMPANY, A CORPORATION OF NEW YORK.

ELECTRIC SHIP PROPULSION.

Application filed September 24, 1921. Serial No. 502,925.

*To all whom it may concern:*

Be it known that I, ALBERT H. MITTAG, a citizen of the United States, residing at Schenectady, county of Schenectady, State of New York, have invented certain new and useful Improvements in Electric Ship Propulsion, of which the following is a specification.

My invention relates to electric ship propulsion and particularly to systems of electric ship propulsion wherein a ship's propeller is driven by an alternating current motor operating as an induction motor for maneuvering operations requiring a large torque, such as acceleration and reversal of the ship, and wherein the induction motor is converted to a synchronous motor for normal synchronous operation.

An object of my invention is to provide a convenient and efficient means for supplying the low voltage direct current excitation required in a system of the class described and a further object is to provide a system which will automatically vary the excitation of the motor in accordance with the load requirements, thus increasing the maximum load that may be carried before the motor will fall out of step.

My invention will be better understood from the following description taken in connection with the accompanying drawing and its scope will be pointed out in the appended claims.

The accompanying drawing illustrates diagrammatically a ship propulsion system embodying my invention.

Referring to the drawing the prime mover 1, which may be, for example, an adjustable speed turbine, is directly connected to the synchronous generator 2, which is connected by the mains 3 to the propeller driving motor 4, the rotatable element of which is directly connected to the ship's propeller 5. Suitable circuit controlling and reversing switches 6 may be provided in the mains 3 for controlling the direction of operation of the motor 4 in a manner well known in the art. The motor 4 will be provided with a phase wound secondary connected to the slip ring 7 in a manner well known in the art. Suitable means may be provided for closing the circuit of the phase wound secondary of the motor for induction motor operation. As illustrated in the drawing, a switch 8 is provided which when thrown to the lower position connects the slip rings 7 of the motor to a suitable starting resistance 9. Suitable means may be provided for reducing the value of the resistance 9 in order to increase the torque of the motor near synchronism. In the drawing a switch 10 is shown for short circuiting the resistance 9. When the motor has been brought practically to synchronism I disconnect the slip rings 7 from the resistance 9 and connect a source of direct current excitation to these slip rings to bring the motor into synchronism. According to my invention a rotary converter 11 is provded for furnishing the direct current excitation to the motor. The alternating current slip rings 12 of the rotary converter are arranged to be connected in series relation with the mains 3 by means of current transformers 13. A switch 14 may be provided for short circuiting the current transformers while the rotary is inoperative. The direct current brushes 15 of the rotary are arranged to be connected to the slip rings 7 when the switch 8 is thrown to its upper position. The rotary converter 11 will preferably be provided with a separately excited shunt field winding 16 connected to a suitable source of excitation such, for example, as the constant voltage source for supplying the excitation for the synchronous generator 2. A switch 17 will be provided for interrupting the circuit of the field winding 16 and suitable means such as a rheostat 18 will be provided for adjusting the strength of the field winding.

The operation of the system will be clear from a brief explanation of a method of accelerating the motor and an explanation of the operation of the system for constant speed and variable load and for variable speed. To start the system shown, into operation, the turbine 1 will be started and the line switches 6 closed for the desired direction of operation. At this phase of the operation the switch 14 will be closed thus short circuiting the current transformers 13. The switch 17 will be open thus de-energizing the rotary and the switch 8 will be in its lower position disconnecting the rotary from the slip ring 7 and connecting the slip rings to the resistance 9. Excitation will then be applied to the main generator and the motor 4 will start as an induction motor and during this phase of operation the synchronous generator may be over-excited to produce a strong induction motor torque in the manner well known in the art. When the motor has accelerated sufficiently the resistance 9 may be short circuited by the switch 10 and the motor will run nearly in synchronism with the generator at which time the excitation on the generator may be reduced to normal. The rotary converter 11 will then be started as an induction motor by opening the switch 14. When the converter comes up to speed switch 17 will be closed thus synchronizing the rotary converter with the generator 2. The switch 8 is then thrown to its upper position thus removing the short circuit from the slip rings 7 and connecting the direct current brushes 15 of the rotary with the phase wound secondary of the motor 4. The motor 4 will thus be brought into exact synchronism with the generator 2. By reason of the inherent action of the combination comprising the current transformers 13 and rotary converter 11 the direct current excitation supplied to the motor, now operating as a synchronous motor, will vary in accordance with the current supplied by the generator 2 to the motor 4. This operation is desirable for the reason that increases in load on the motor, whether due to head winds, pitching of the ship or movements of the helm require an increase in the motor field excitation to prevent the motor from falling out of step.

The use of a rotary converter for supplying the excitation for synchronous operation of a motor of the type described is advantageous for the reason that the voltage required is quite low and it would be undesirable in a ship propulsion system to provide a special direct current generator for furnishing so low a voltage and the regulation of such a generator for the changes in excitation required would be inconvenient. A rotary converter, however, may be efficiently designed for this low voltage and when connected to the current transformers inherently provides such changes in voltage as are necessary for an approximately correct variation of the motor field current.

Speed changes of the propeller driving motors are customarily secured in ship propulsion systems by varying the frequency of the generator, as for example, by varying the speed of the prime mover driving the generator. Upon a reduction in speed of the system to one-half, the current taken by the motors will fall off one-half and the exciting current for the motor should be decreased approximately one-half. The converter will give approximately the required regulation of the motor field current but owing to the change in reactance of the circuit supplied by the current transformers with the reduction of speed, the regulation may not be rigorously accurate. Such changes in excitation as may be required, may be secured by changing the field excitation of the rotary by adjustment of the rheostat 18.

What I claim as new and desire to secure by Letters Patent of the United States, is,—

1. An electric ship propulsion system comprising an adjustable speed synchronous generator, a propeller driving motor provided with an armature having a phase winding adapted to be supplied with direct current for synchronous operation, a rotary converter having its alternating current end connected in series relation between said generator and motor and means for connecting the direct current end of said rotary converter to said phase winding for synchronous operation of said propeller motor.

2. An electric ship propulsion system comprising an adjustable speed synchronous generator, a propeller driving motor provided with a phase wound secondary, a rotary converter having its alternating current end connected in series relation between said generator and motor, a starting resistance for said motor secondary winding and switching means whereby said secondary winding may be connected either to said starting resistance for induction motor operation or to the direct current end of said rotary converter for synchronous operation.

3. An electric ship propulsion system comprising an adjustable speed synchronous generator, a propeller driving motor provided with a phase wound secondary, a rotary converter provided with a separately excited shunt winding, current transformers connected to supply current to said rotary converter proportional to the current supplied from said generator to said motor and switching means whereby said secondary winding may either be closed for induction motor operation or connected to be supplied from the direct current end of said rotary converter for synchronous operation.

4. The method of operating a ship propulsion system comprising a synchronous generator, a propeller driving motor provided with a phase wound secondary, and a rotary converter with its alternating current end connected by means of current transformers in series between said generator and motor, which consists in bringing said motor up to speed as an induction motor while maintaining said current transformers short circuited, then opening the short circuit for said current transformers to start said rotary converter as an induction motor, then exciting said rotary converter to synchronize the same and then connecting said rotary converter to supply direct current to said secondary winding for synchronous operation of the propeller driving motor.

In witness whereof I have hereunto set my hand this 23rd day of September, 1921.

ALBERT H. MITTAG.